United States Patent [19]

Åkesson

[11] 4,372,089
[45] Feb. 8, 1983

[54] ENERGY SAVING BUILDING AND METHOD OF MAKING SAME

[76] Inventor: Knut V. Åkesson, Dalsberga gard, Fack 35, S-775 01 Krylbo, Sweden

[21] Appl. No.: 137,777

[22] Filed: Apr. 7, 1980

[30] Foreign Application Priority Data

Apr. 6, 1979 [SE] Sweden .................. 7903109
Dec. 20, 1979 [SE] Sweden .................. 7910567

[51] Int. Cl.³ ............................................ E04B 1/78
[52] U.S. Cl. ........................................ 52/404; 52/94;
   52/236.3; 52/408
[58] Field of Search ............... 52/408, 409, 410, 411,
   52/412, 404, 406, 86, 236.3, 236.7, 94, 95, 90,
   92, 93; 220/415, 423, 433

[56] References Cited

U.S. PATENT DOCUMENTS 3,990,202 11/1976 Becker .................. 52/404
4,224,773 9/1980 Schworer .................. 52/404
4,226,071 10/1980 Bennett .................. 52/409

FOREIGN PATENT DOCUMENTS 995554 12/1951 France .................. 52/408

OTHER PUBLICATIONS

Sweet's Catalog File 1979, *Alumiseal* 7.16AL, 12 pages, TH455 S8

*Primary Examiner*—John E. Murtagh
*Attorney, Agent, or Firm*—Frishauf, Holtz, Goodman & Woodward

[57] ABSTRACT

An integral airtight layer in the floor, the walls and the roof surrounds the entire useful space of a house or other building. The tightness of the layer is tested before the flooring and inner wall linings are mounted. The airtight layer is made of a diffusion tight material so that it serves as a vapor barrier. The vapor barriers in two stories of the building can be united by a non-diffusion tight layer that encompasses an intermediate floor structure. The resulting building will be practically completely air tight.

19 Claims, 13 Drawing Figures

ENERGY SAVING BUILDING AND METHOD OF MAKING SAME

BACKGROUND OF THE INVENTION

This invention relates to a method of building an energy saving building and to an energy saving building.

When building stud frame houses or other buildings, board sheeting is usually applied on the outside of the studs at the inside of the outside panel. Such board sheeting serves both as a wind stop or barrier and as a stabilizing means for the stud frame. On the inside of the studs, a diffusion tight thin polyethylene film is usually applied to serve as a moisture or vapor barrier (hereinafter referred to as "vapor barrier"). The joints of the film are overlapping joints which are usually not sealed. The vapor barriers in the roof, walls and floors are usually applied separately and they are not tightly jointed or sealed against one another. Thus, the vapor barrier of the building is not airtight although the film itself is both airtight and difusion tight. Since there is no barrier against drafts through the construction, no test of the air tightness is usually made, and if a test of the air tightness is made when the building is finished and it is too late to improve the tightness without heavy costs.

An object of the present invention is to provide a building and a building method which enables completely airtight buildings to be made almost without any increase in cost. Such a building will be energy saving not only because it permits for a controlled ventilation and because its indoor climate becomes more comfortable so that the indoor temperature can be lowered, but also because the insulation material in the floor, roof and walls will function more efficiently. Further, a completely tight building permits for an efficient functioning of an energy exchanger coupled between the inflow of ventilation air and the exhaust air.

SUMMARY OF THE INVENTION

According to the present invention, a method of building an energy saving building comprises applying an integral airtight layer in the floors, the walls and the roofs; sealing off the airtight layer at the edges of the layer; testing the air tightness of the airtight layer; and then, repairing any deficiencies in the airtight layer and its edges before the joints of the airtight layer and the sealed off edges of the airtight layer is covered.

Preferably, the airtight layer is applied inside the load-carrying part of the walls, and the interior wall surface material is applied spaced from the airtight layer.

A tight and energy saving building according to the present invention comprises a first level; a second level above the first level and separated from the first level by a floor structure; an integral airtight vapor barrier inside the major part of the thermal insulation material in the floor and walls of the first level; an integral airtight vapor barrier inside the major part of the thermal insulation material in the roof and walls of the second level; and an airtight layer that circumvents the joints of the floor structure. The airtight layer circumventing the floor structure joints is preferably not damp or moisture proof.

DETAILED DESCRIPTION

Figure 1:
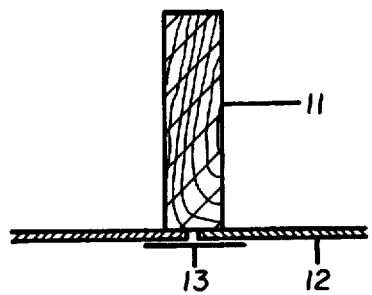
FIG. 1 is a fragmentary horizontal section of a stud frame that is airtightened.
Figure 2:
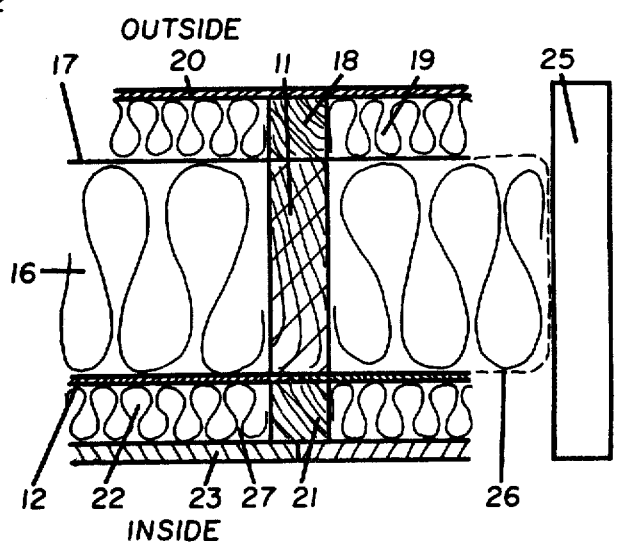
FIG. 2 is a section corresponding to FIG. 1 but showing the wall when it is completed.
Figure 3:
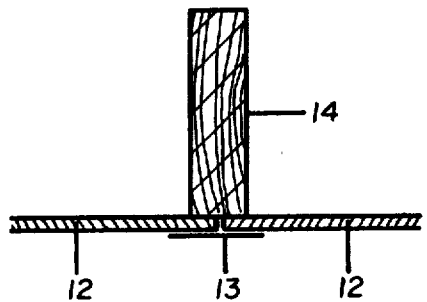
FIG. 3 is a vertical section of a roof structure against a cold space.
Figure 4:
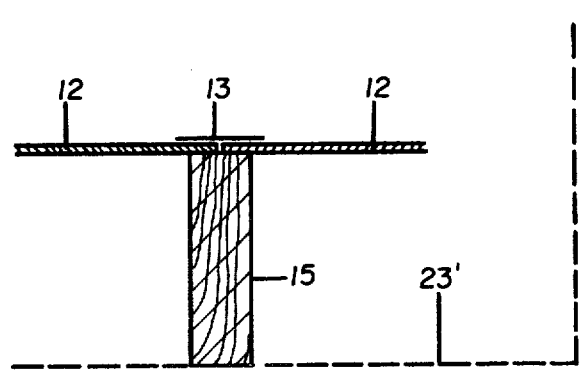
FIG. 4 is a vertical section of a floor structure against a cold space.

When a non-prefabricated house is being built in accordance with the invention, it is preferably done as will be described. First, the stud frame is erected and FIG. 1 shows a vertical stud 11 in the wall. Frame stabilizing board sheets 12, e.g. thin hard board or the like, are nailed to the inside of the stud frame. The board sheets 12 serve also as a vapor barrier and as an airtight layer. The joints of the board sheets 12 are tightened by means of jointing strips 13 of tough paper that is glued to the board sheets. In the same way, board sheets are nailed to the frame against other cold spaces, for example in the roof structure of a one-story house as shown in FIG. 3. A joist 14 of the roof structure is shown in FIG. 3. A joist 15 of a floor structure is illustrated in FIG. 4. The board sheets 12 and the jointing strips 13 have been designated with the same reference numerals in all the figures. All the joints of the board sheets 12 in the walls, in the floor, and in the roof, and between the walls, the floor and the roof are airtightly jointed by means of glued jointing strips 13. The airtight layer formed by the board sheets 12 is also tightened at all its edges and openings; for example tightened against door frames and window frames by means of glued jointing strips or other sealing strips having sealing elements of rubber or any suitable material. In FIG. 2 a sealing element 26 is shown that is sealed off against a frame 25 of a window or door. In a 1 and ½ story house, that is, a house having a full story and an attic, one must carefully seal off against the joists of the upper floor structure if the attic is to be enclosed in the airtight layer. In houses having two or more stories, one must seal off against the joists of all the intermediate structures.

Thus, an integral airtight layer is formed that encloses a volume of the building and suitably encloses the entire volume of the building. A basement can be enclosed in the airtight layer or it can be outside the airtight layer. Alternatively, the basement can be enclosed separately in another airtight layer. In the same way, the airtight layer should preferably enclose an attic as described, but the attic can instead be separately airtightened by a closed airtight layer of its own. It is also possible to make a combination in such a way that an attic, a basement or any other part volume of the house or building is enclosed within the major airtight layer and this part volume is separated from the major part of the building by means of an airtight layer that is not moisture proof, i.e., that is not diffusion tight enough to serve as a vapor barrier. This combination is particularly suitable if the part volume is intended to be used alternatively as a heated or unheated space in wintertime.

The board sheets 12 should not be so strong that it can move at its nailed edges when it is subject to variations in relative dampness and temperature. It should be instead knuckle. Suitably, a fiber board is used that is not diffusion tight enough to serve as a vapor barrier. Instead it is provided with a diffusion tight layer, for example a strong tough paper that is glued to it by means of asphalt or the like. Suitably, the board should also be provided with a reinforcement, e.g. a glass fiber net, that serves as a protection if someone steps on the board. Alternatively, a paper can be used that comprises two layers of paper with a diffusion tight asphalt and a glass fiber net therebetween. The board can be a 3 mm thick hard board of the lowest quality that has no glue in it. Instead of using a board 12 that is damp or moisture proof or made damp proof material, a board that is not damp or moisture proof can be used and a damp or moisture proof air tight layer, e.g. a reinforced paper of the kind described, can be placed at the inside of the board when the board has been mounted. Then, the paper can be attached to the board 12 by being glued to the board at spaced spots so that it will not fall down.

When the airtight layer 12 is completed the air tightness of the frame of the house can be tested. FAr this purpose, all windows, doors, chimneys and ventilation passages are closed. Then, a smoke torch can be lit and a fan can be used to increase the pressure in the house to for example 50 Pascal over the atmospheric pressure. Any leaks can now be visually indicated from the outside and can easily be tightened. Alternatively to this method, subpressure can be put to the house and then, from the inside of the house one can detect leaks by moving a hand that is wet by soap water along all the joints and sealed edges. One will easily detect any leak flow of air by this method, and can immediately tighten the leaks.

After a preliminary qualitative control as described above, a quantitative test is carried out. This test can preferably be a trace gas detecting test. A predetermined quantity of a test gas e.g. nitrous oxide is supplied to the closed building. Then, the reduce in the percentage of the nitrous oxide is controlled continuously or at intervals while the building is put under a pressure of for example 50 Pascal above atmospheric pressure or 50 Pascal below atmospheric pressure by means of a fan. Conventional metering of the air flow through the fan is usually not suitable because it is not very reliable when the flow is small.

A tightness of 0.1 air exchanges an hour at a test pressure of 50 Pascal can easily be achieved. The major part of this leakage is leakage between the windows ad doors and their frames. If the doors and windows are specially sealed for the test, then a leakage of 0.01 air exchanges can be achieved. If the overall leakage (that is inclusive of the normal leakage in doors and windows) is greater than 0.3 at the test, then, the leakage must be found and the airtight layer must be repaired. In some cases an overall tightness of 0.5 at the test can be tolerated.

Figure 12:
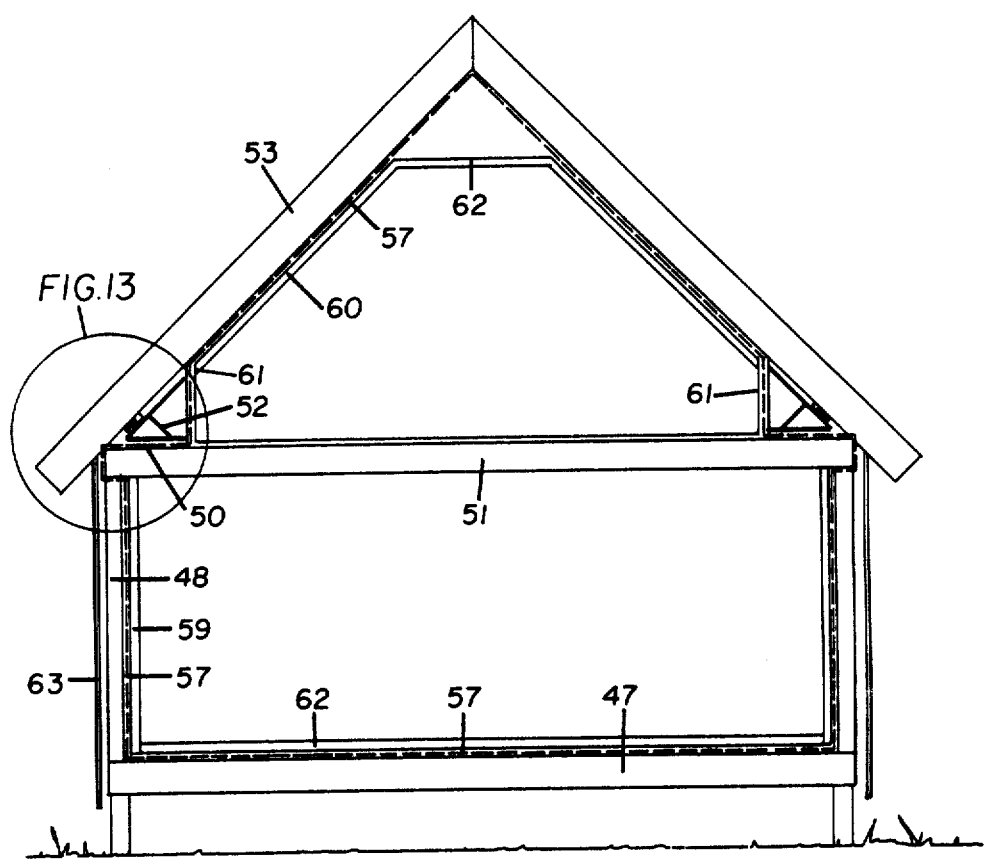

When the frame of the building has been tested and found satisfactorily airtight, it is compelted. Insulation 16, e.g. thick sheets of mineral wool, is placed between the studs 11 of the frame and an airtight layer 17, often called a wind stop or barrier, is attached to the frame 11 outside of the insulation 16. The wind stop 17 can be a reinforced paper of the same kind as the paper 13 glued to the boards 12, but is diffusion tightness should be less than 10% thereof so that any dampness can escape outwardly from the insulation 16 to the outside of the building. The wind stop 17 is glued at its joints and united airtightly with the vapor barrier 12 so that the insulation 16 will be airtightly enveloped in one or more envelopes. See section 26 of wind stop 17 in FIG. 2. Outside the wind stop 17, the outside panel 20 is mounted for example on battens 18 that are nailed to the studs 11. A thin mineral wool insulation 19 is put between the battens 18 at the inside surface of the outside panel 20. This insulation 19 serves as a protection against rapid temperature changes in the wind stop 17; i.e. temperature changes that could cause temporary condensation on the inside of the wind stop 17. Battens 21 are nailed to the interior surface of studs 11 so that a space 22 is formed adjacent the inside directed surface of the vapor barrier 12. Electric cables and electrical boxes (i.e., outlets, switches, etc.) can therefore be drawn in the space 22 without any holes being made in the moisture proof airtight layer (vapor barrier) 12. Before the inner lining 23, e.g. plaster board or any other suitable board, is nailed to the battens 21, mineral wool insulation 27 can be filled in the space 22 as shown in FIG. 2. The distance between the interior wall surface, that is, the interior surface of the inner lining 23, and the airtight layer 12 should be at least 5 cm so that the airtight layer 12 will not be damaged for example when nails for pictures are put inot the wall. It is sometimes desirable to avoid relying on an airtight layer above the floor joists. In that case, the airtight layer can be applied to the underside of the joists as indicated by dashed lines 23' in FIG. 4. In the FIG. 4 arrangement, the material 23' should not be damp proof. It must of course be sealingly glued to the vapor barrier 12 of the wall so that an integral airtight layer is formed. A disadvantage of the FIG. 4 arrangement is that the airtight layer must be sealed off against the joists if the airtight layer cannot circumvent the entire floor structure in the same way as illustrated in FIG. 12. Further, a vapor barrier should be used above the joists of the floor and preferably it should also be sealed off against the airtight layer of the walls.

Figure 5:
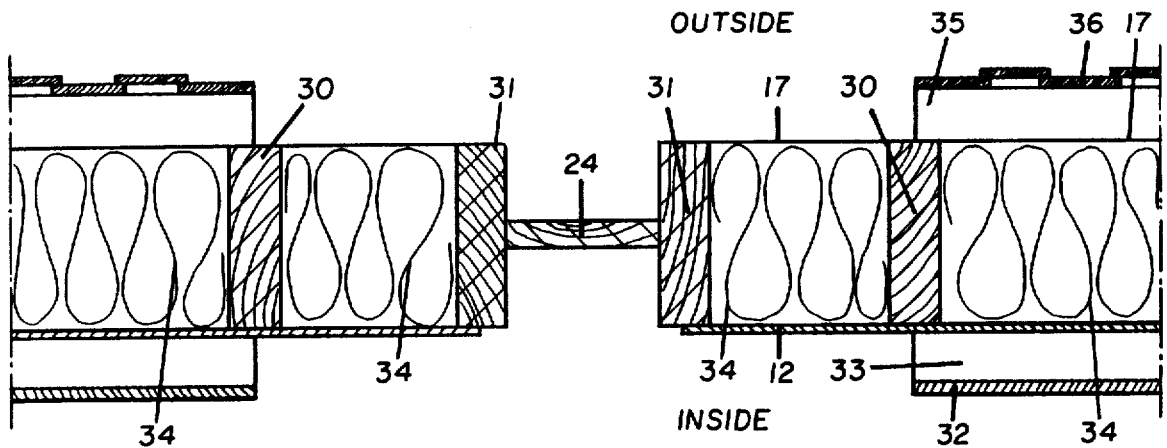
FIG. 5 is a horizontal section showing two wall blocks having an unfinished joint.
Figure 6:
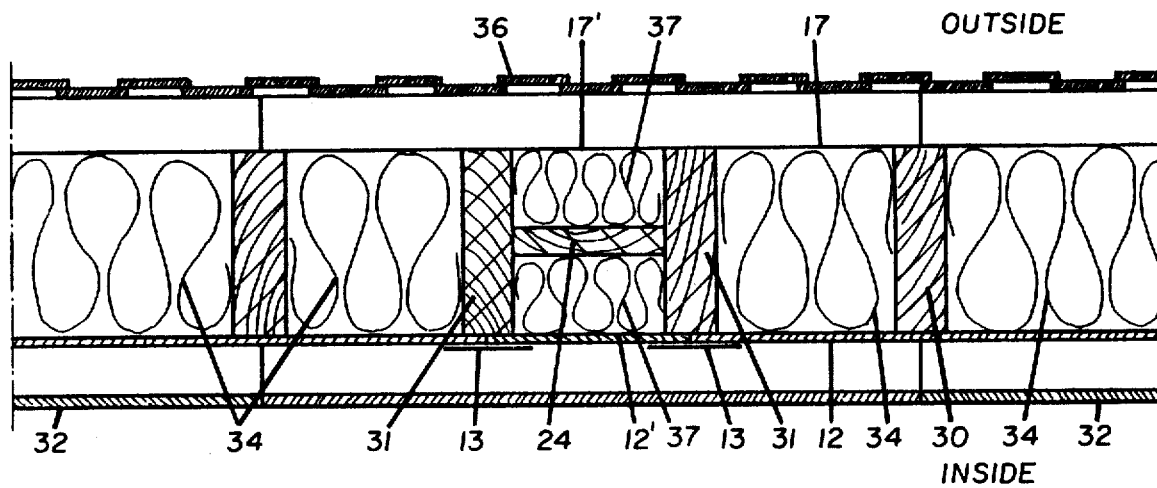
FIG. 6 is a horizontal section corresponding to FIG. 5 but showing the joint between the wall blocks when completed.

In FIGS. 5 and 6, the invention is shown applied to prefabricated wall blocks. Two wall blocks are shown coupled together by means of a spacer or connecting element 24. The wall blocks each comprise a stud frame, two studs 30 and 31 of which are shown. From the inside to the outside, the wall block elements comprise an inner panel 32, for example plaster board, on horizontal battens 33, a damp-proof and airtight vapor barrier layer 12 of the kind that has been described with reference to FIGS. 1-4, mineral wool insulation 34 between the studs of the stud frame 30,31, a wind stop layer 17 in the form of an airtight paper layer as described with reference to FIGS. 1-4, horizontal battens 35, and an outside panel 36.

Between the horizontal battens 33 as well as between the horizontal battens 35, there can preferably also be a mineral wool insulation such as insulation 19,27 in FIG. 2. The horizontal battens 33 and 35 end against the studs 30 whereas the airtight vapor barrier 12 and the wind stop layer 17 each end against the studs 31.

As seen in FIG. 6, after the wall blocks have been coupled together as shown in FIG. 5, the airtight and damp proof board 12 of two adjacent wall blocks are united by means of a piece of board 12' and the joints therebetween are air tightened by means of joint strips 13 in the same way as described with reference to FIGS. 1-4. In the same manner, the vapor barriers 12 of the roof, walls and floor are jointed to form an airtight integral layer.

A test of the air tightness can be carried out in the same way as described with reference to FIGS. 1-4. Then, the inner walls 32 are completed, the space between the two studs 31 is filled with mineral wool or another insulation material 37, the wind stops 17 of adjacent wall blocks are united by means of a piece 17' of wind stopping paper, and the outer panel 36 is completed to form the structure shown in FIG. 6.

Figure 7:
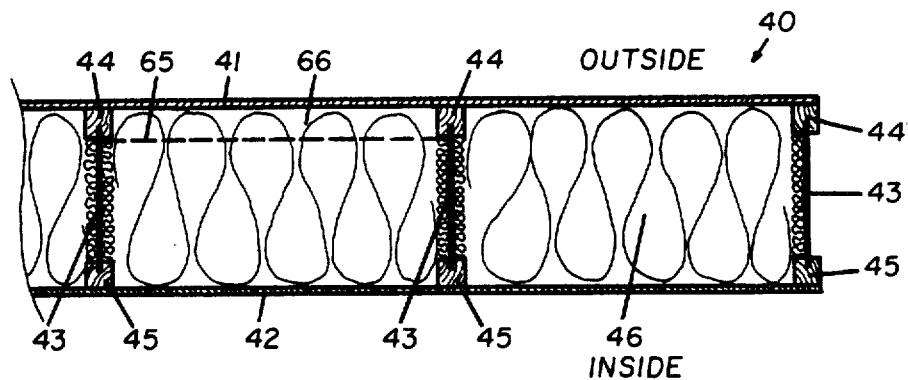
FIG. 7 is a section of a building element in the form of a prefabricated unit.

In FIGS. 7-13, a way of building houses or other buildings is shown in which one need not seal off the airtight layer against the joists of an intermediate floor structure. Self-supporting prefabricated units are used as floor structures, as wall structures and as roof structures. In FIG. 7, such a prefabricated structure 40 is shown. It comprises two board sheets 41 and 42, preferably plywood sheets. The two plywood layers 41,42 are held together with beams that comprise battens 44,45 and an intermediate board web 43. The intermediate web 43 can be made of hard board or plywood. The webs 43 are glued to the respective battens 44,45 and the battens are both glued and/or nailed to the plywood sheets 41 and 42. The space between sheets 41 and 42 is filled with insulation material 46, for example mineral wool insulation. The units 40 are preferably made as closed units so that there cannot be any draft in the fiber insulation 46 which is filled between sheets 41 and 42. In FIG. 7, a thin board 65 is indicated with dashed lines. This board 65 is used in the roof units only so that a ventilated empty space 66 is formed above the insulation 46. In such a roof unit, the insulation 46 will fill the space only between board 65 and inner sheet 42.

In the wall cassettes, the plywood takes up the load and the studs in the wall cassettes are necessary only as distance elements and as stiffening elements during transport. Therefore, the studs in the wall cassettes are horizontal. The wall cassettes can have the full height of a storey and they can have a length of more than 10 m, that is, a single wall cassette can often form a whole wall. The wall cassettes can for example be 10 cm thick. The roof cassettes and floor cassettes are usually about 30-40 cm thick and they can preferably have a width that is the same as the height of the wall cassettes.

Figure 8:
FIGS. 8–12 show various stages of the construction of a house in which units of the kind shown in FIG. 7 are used.
Figure 9:
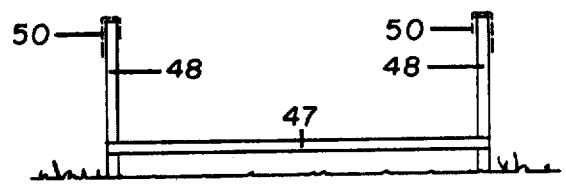
Figure 10:
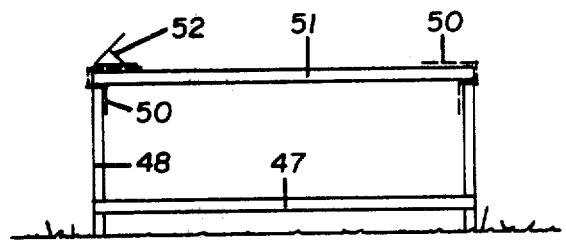
Figure 13:
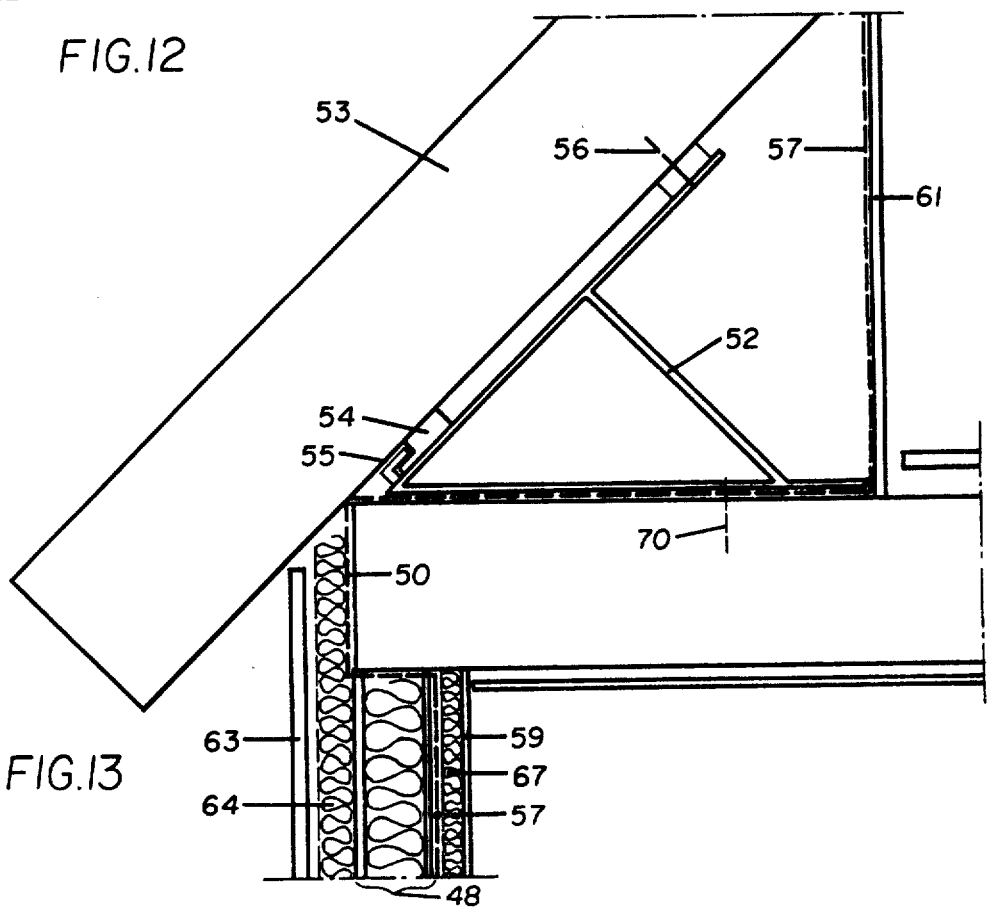
FIG. 13 shows on a larger scale the circled part of FIG. 12.

When building a house made up of such units as described with reference to FIG. 7, the floor units 40 are first placed on the foundation 49 to form a floor structure 47 as shown in FIG. 8. Units 40 forming the walls 48 are mounted on the floor structure 47 and reinforced airtight but not damp (vapor) proof paper 50 is rolled out on the upper end of the walls 48 as shown by dashed lines in FIG. 9. Airtight paper 50 is airtightly glued to the walls 48 at their joints as shown in FIG. 9. Units 40 forming the intermediate floor or ceiling structure 51 are mounted on the walls 48 and the unglued portion of the airtight paper 50 is bent around the outer edge of the intermediate floor or ceiling structure 51 so as to circumvent or encircle the intermediate floor structure 51 at the area of its joint with the walls 48. Steel mountings or plates 52 for the roof units 40 are screwed to the intermediate floor structure 51 by means of screws 70 as shown in FIGS. 10 and 13. The units 40 forming the roof 53 have hooks 54 as shown in FIG. 13 and the hooks 54 interlockingly engage mating hooks 55 of the mountings 52 to support the roof units 53. The units of the roof 53 are further secured to the mountings 52 by means of screws 56, as seen in FIG. 13.

Figure 11:
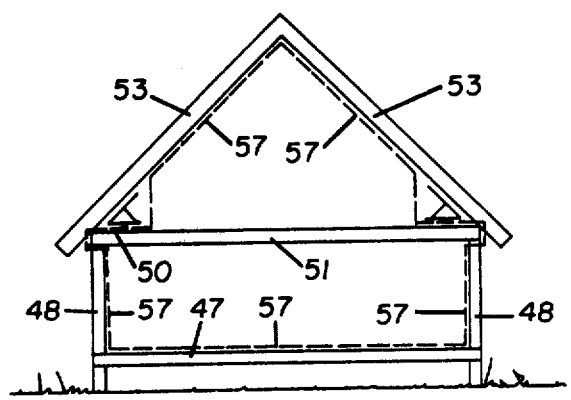

Referring to FIG. 11, when the frame of the house has been erected as described, a damp proof glass fiber reinforced paper 57 of the kind previously describes is rolled out against the inside of the limiting surfaces of the house, i.e. gainst the inside of the floor 47 and the vertical walls 48 in each story, the oblique roof 53 and the gables in the attic story. Damp or vapor proof paper 57 is shown by dashed lines in FIG. 11, as is the paper 50. Alternatively, the paper 57 can be glued to the units 40 at the factory.

All joints in the diffusion tight paper 57 are glued so that they are tight and the paper 57 is attached to the units 40 by dots of glue. The paper 57 forms the vapor barrier of the house and it is airtightly glued to the nondiffusion tight paper 50 that circumvents the joints of the intermediate floor structure 51. Thus, the vapor barrier 57 of the two stories form together with the paper 50 an integral airtight layer that enclosed the entire useful volume of the house and no construction elements such as joists and tie beams extend through the airtight layer 50,57. This airtight layer 50,57 is sealed off at all its edges for example around chimneys, door frames and window frames by means of sealing members attached to the chimneys or frames or it is sealingly glued directly to the frames. The airtight layer 50,57 is also carefully sealed off against service lines (i.e., electrical lines, plumbing pipes, heating and cooling pipes and/or ducts, etc.) and other possible elements which have to extend through the vapor barrier layer 50,57.

The air tightness of the house can now be tested in the way previously described with reference to FIGS. 1-4. Preferably the gas detection method and sub-pressure is used. The airtight layer 50,57 extends integrally behind the interior walls of the house because the interior walls are not erected over the airtight layer 50,57 until the airtight layer 50,57 is tested. Also if there is a load carrying interior wall, the airtight layer 50,57 should extend integrally behind this wall. At the inside of the vapor barrier 57, horizontal battens are nailed to the units 40, and a lining, for example plaster board, is nailed to these battens to form an inner wall surface 59 at a spacing from the damp proof airtight layer 50,57. In FIGS. 12 and 13 this vertical inner wall 59 of the full story of the house and a corresponding oblique or inclined ceiling 60 and a vertical wall 61 of the attic level are shown. There will be for example at least a 5 cm space between the plaster board 59,60,51 and the damp proof airtight layer 57 and electric cables, electrical boxes and possibly also water pipes of the heating system are placed in this space. Preferably this space is also filled with an insulation material 67 such as mineral wool as shown in FIG. 13. Instead of battens and board, compound board sheets can be used which comprise for example a plaster board and 5 cm thick relatively stiff insulation. The flooring 62 is also suitably placed at a spacing from the floor units 40 so that a space is formed. The space below the floor is also suitable for cables and conduits. The vertical wall 61 in the attic level is also spaced from the damp proof airtight layer 57. This wall 61 need not necessarily be insulated but it may be insulated. The horizontal ceiling 62 in the attic may also be provided with a thin insulation therebehind.

Battens are nailed to the outside of the wall units and the spaces between the wall units and the panel mounted on the battens are suitably filled with insulation 64, as shown in FIG. 13. The outside of the units serve as a wind stop but the joints between the units in the floor, roof and walls can preferably be bridged by airtight jointing paper strips that are glued to the units, as discussed hereinabove.

There is no vapor barrier at the outer edges of the roof units 51 since the paper 50 is not diffusion tight. A separate vapor barrier may be placed inside the outer ends of the roof units 51 but this is usually not necessary.

Preferably, the airtight jointing strip described above can be a paper strip that has a thermoplastic resin glue on one side. The thermoplastic glue should not be adhesive until heated to about 60 degrees Celsius. Then, the jointing strips can be affixed to the overlapping portions of the paper layer by means of a heating tool such as an ordinary domestic heating iron.

In the above described and illustrated embodiments of the invention, the airtight layer is damp or moisture proof and serves also as a vapor barrier, which ensures that no air from the inside of the building can leak past the vapor barrier and cause condensation in the insulation when the outdoor temperature is low. The vapor barrier is located inside the insulation. In buildings or stores for holding deep frozen food, the combined airtight layer and vapor barrier should be located outside the insulation instead of inside the insulation.

In this specification, the expression diffusion tight does not mean absolute diffusion tightness but it means a certain practical degree of diffusion tightness. Such practical levels are usually defined by the building authorities. The same applies for the synonymous expression damp or moisture proof.

I claim:

1. Tight and energy saving building, comprising:
a first level having a floor as the lower surface thereof and upwardly extending walls;
a second level above said first level and separated from the first level by an intermediate floor structure (51) and having generally upwardly extending members extending upwardly from said intermediate floor structure;
said intermediate floor structure being jointed to said walls of said first level and to said upwardly extending members of said second level;
an upper structure extending over said second level;
thermal insulation material in said floor, in the walls of said first level, in said upwardly extending members of said second level and in said upper structure;
an integral airtight vapor barrier (57) interior (with respect to the building) of a major part of the thermal insulation material in the floor and walls of the first level;
an integral airtight vapor barrier (57) interior (with respect to the building) of a major part of the thermal insulation material in the upper structure and in the walls of the second level; and
an airtight layer (50) that extends through the joints between said intermediate floor structure and the walls of said first level and the upwardly extending members of said second level, said airtight layer (50) extending around the outer periphery of said intermediate floor structure;
said two airtight vapor barriers (57, 57) being sealingly united with said airtight layer (50).

2. Building according to claim 1 wherein said airtight layer (50) that extends around said intermediate floor structure is not damp-proof.

3. Building according to claim 1 wherein said first level is the lowermost level of the building.

4. Building according to claim 1 wherein said first level is an intermediate level of the building.

5. Building according to claim 1 wherein said airtight vapor barriers (57) and airtight layer (50) are sealed off at their edges.

6. Building according to any one of claims 1, 2, 3 or 4, wherein said vapor barriers (57) and airtight layer (50) together form an integral airtight layer that encloses a heated volume of the building.

7. Tight and energy saving building, comprising:
a first level having a floor as the lower surface thereof;
walls extending upwardly from said floor;
a roof or upper member over said walls;
the walls and roof or upper member being made up of self-supporting units (48, 51, 53), each of said self-supporting units comprising two spaced sheets (41, 42) and beams arranged between said spaced sheets, said spaced sheets being affixed to said beams so that closed spaces are formed between said sheets and in said self-supporting units;
an insulation material (46) in said closed spaces between said sheets of said self-supporting units;
a vapor barrier (57) arranged on the outside of one side of said sheets and bridging all of the joints between said self-supporting units.

8. Building according to claim 7 comprising an inner lining (59) and an outer facing (63) on said self-supporting wall units (48); and a thermal insulating material (64, 67) disposed on both sides of the self-supporting wall units (48), on the one outer side between the wall units (48) and said facing (63) and on the interior side between the wall units and said inner wall lining (59).

9. Building according to claim 8, wherein said vapor barrier (57) in the walls is located between the wall units (48) and the insulating material (67) that is located between the wall units and the inner wall lining (59).

10. Building according to claim 7, wherein said vapor barrier (57) extends integrally behind the inner walls of the building.

11. Building according to claim 7, wherein also the bottom floor structure comprises a self-supporting floor unit (47) and said vapor barrier (57) covers also the bottom floor structure.

12. Building according to claim 11, wherein the vapor barrier (57) is part of an integral airtight layer (50, 57) that has glued joints and sealingly encloses a volume of the building.

13. Building according to claim 7 or claim 11, wherein the vapor barrier (57) is glued to the units.

14. Building according to claim 11, wherein said airtight layer (50, 57) comprises a paper layer.

15. Building according to claim 1, wherein said upper structure extending over said second level comprises a roof.

16. Tight and energy saving building, comprising:
a first level having a floor as the lower surface thereof and upwardly extending walls;
a second level above said first level and separated from the first level by an intermediate floor structure (51) which is jointed to said walls of said first level;

an upper structure extending over and jointed to said intermediate floor structure (51) of said second level;

thermal insulation material in said floor, in the walls of said first level, in said upwardly extending members of said second level and in said upper structure;

a first airtight layer (57) interior (with respect to the building) of a major part of the thermal insulation material in the floor and walls of the first level;

a second airtight layer (57) interior (with respect to the building) of a major part of the thermal insulation material in the upper structure; and a third airtight layer (50) that extends through the joints between said intermediate floor structure and the walls of said first level and the upper structure, said third airtight layer (50) extending around the outer periphery of said intermediate floor structure;

said first and second airtight layers (57, 57) being sealingly united with said third airtight layer (50).

17. Building according to claim 16, wherein said first and second airtight layers (57, 57) are each integral airtight vapor barriers.

18. Building according to claim 16 or 17, wherein said first, second and third airtight layers (57, 57, 50) are sealed off at their edges.

19. Building according to claim 16 or 17, wherein said first, second and third airtight layers (57, 57, 50) together form an integral airtight layer that encloses a heated volume of the building.

* * * * *